UNITED STATES PATENT OFFICE.

WILLIAM COOLEY, OF WATERBURY, VERMONT.

PROCESS OF PREPARING CURD FROM BUTTERMILK.

SPECIFICATION forming part of Letters Patent No. 241,788, dated May 24, 1881.

Application filed October 11, 1880. (No specimens.)

*To all whom it may concern:*

Be it known that I, WILLIAM COOLEY, a citizen of the United States, residing at Waterbury, in the county of Washington and State of Vermont, have invented certain new and useful Improvements in the Process of Preparing Curd from Buttermilk for the Manufacture of Cheese; and I do hereby declare the following to be a full, clear, and exact description of the invention, such as will enable others skilled in the art to which it appertains to make and use the same.

The object of my invention is to utilize the caseine contained in buttermilk in the manufacture of cheese; and the invention consists in preparing buttermilk-curd as hereinafter described and claimed.

In carrying out my invention I first heat the buttermilk in any suitable vessel, to cause the curd to settle to the bottom. I then dip or draw off the whey from the curd, add sufficient warm water to fill the vessel, and stir thoroughly to wash out the lactic acid. After the curd has been again allowed to settle the water is drawn off, more warm water added, and the washing continued, as before, until the acid is all removed. I sometimes add a small quantity of the bicarbonate of soda to assist in removing the acid. The curd, after being thoroughly deprived of its acid in this manner, is drained and slightly pressed to remove any water that may remain. This prepared curd may, if desired, be now thoroughly mixed with the curd from other milk and the whole made into cheese in the usual manner. But, for a better article, I add oleaginous material in the form of cream, melted butter, or lard, in the proportions of from one to three pounds of the cream, melted butter, or lard to ten pounds of the curd prepared from buttermilk in the manner above described. I now disintegrate this compound in from four to six times its weight of milk, in any suitable apparatus, so as to secure an intimate union of the ingredients, after which the compound is added in any desired proportions to milk contained in a suitable cheese-vat and manufactured into cheese in the ordinary manner.

I am aware that curd prepared from sour skim-milk and from buttermilk has been heretofore employed in the manufacture of cheese; also that an alkali and a suitable oleaginous material have been added to such curd, which is afterward coagulated by means of rennet. I am not aware, however, that the successive steps of my process have been ever before practiced, or that the ingredients of prepared curd have been so thoroughly disintegrated and intimately combined with milk as is contemplated by my improved process. Therefore,

What I claim as my invention is—

The herein-described process of preparing curd from buttermilk to be used in the manufacture of cheese, consisting in first heating the buttermilk in a suitable vessel to precipitate the curd, then adding warm water to the curd and washing out the lactic acid, then draining and pressing the curd to remove the water, then adding to the curd a suitable oleaginous material—such as cream, melted butter, or lard—in about the proportions stated, after which the compound is thoroughly disintegrated and intimately mixed with milk in suitable proportions, substantially as specified.

In testimony whereof I affix my signature in presence of two witnesses.

WILLIAM COOLEY.

Witnesses:
F. H. SCHOTT,
A. R. BROWN.